Oct. 6, 1959

H. H. SANDER 2,907,897

PRESSURE TRANSDUCER

Filed July 9, 1956

INVENTOR:
Howard H. Sander
BY

Attorney

United States Patent Office 2,907,897
Patented Oct. 6, 1959

2,907,897
PRESSURE TRANSDUCER

Howard H. Sander, Albuquerque, N. Mex., assignor, by mesne assignments, to the United States of America as represented by the United States Atomic Energy Commission Application July 9, 1956, Serial No. 596,807

4 Claims. (Cl. 307—88.5)

This invention relates generally to pressure transducers and more particularly to those pressure transducers using transistors.

Many pressure transducers of the prior art consist of a circuit element such as a resistor, capacitor or inductance whose value is variable with pressure and which is electrically connected as part of an electronic oscillator circuit. The transducer is frequently physically separated from the remainder of the oscillator because of space limitations, necessitating long connecting wires which are often a hindrance to efficient operation.

A recent discovery of the effect of a magnetic field on the operation of a transistor, described in Patent No. 2,702,316 "Signal Modulation System," issued February 15, 1955, to Albert W. Friend, is applied to the problem of reducing the size and increasing the efficiency of pressure transducers in the invention to be described. Briefly, it has been found that if a magnetic field is applied to a transistor in a direction transverse to the direction of the current flowing between the emitter and the collector of the transistor, the efficiency of the current flow is increased or decreased, according to the polarity of the magnetic field. The Friend patent describes using this phenomenon in a signal modulation system to modulate an electrical signal in accordance with a varying magnetic field.

In one embodiment of the present invention a source of constant magnetic flux supplies flux to at least two parallel paths or magnetic circuits, one of which contains a transistor, and either of which has a reluctance variable with pressure. Since the flux in a magnetic circuit is inversely proportional to the reluctance of the circuit, the flux in the variable-reluctance circuit will vary with pressure. A comparable but opposite variation in flux will occur in a parallel circuit since the circuits are fed by a constant flux source, so that if the transistor is correctly oriented in either circuit, the flow of current from emitter to collector will vary with the flux, and hence with the pressure.

In another embodiment two flux paths are provided through a transistor, the flux being supplied by a constant source. The directions of the paths are different and their reluctances vary mutually inversely with pressure. Hence the resultant flux through the transistor varies in magnitude and direction according to the pressure, thus varying the transistor's conduction characteristics.

The transistor may be connected as part of a modulation system such as those shown in the Friend patent, with the result that a carrier wave is modulated in accordance with the pressure. Using the modulation circuitry herein described, the circuit components can be contained within the transducer case, making a complete telemetering package, from transducer to transmitter, in less than two cubic inches.

It is the general object of the present invention to provide a more compact and more efficient pressure transducer than is found in the prior art.

Another object is to provide a pressure transducer utilizing the effects of a pressure-controlled magnetic field on the conducting properties of a transistor.

Another object is to provide a pressure transducer yielding an electrical signal proportional to a pressure-controlled magnetic field.

Another object is to provide a pressure transducer yielding an electrical signal proportional to the magnitude of a pressure-controlled magnetic field.

Another object is to provide a pressure transducer yielding an electrical signal proportional to the direction of a pressure-controlled magnetic field.

Other objects of the invention and a better understanding of its structure and use may be had by reading the description to follow in conjunction with the attached drawings in which.

Figure 1:
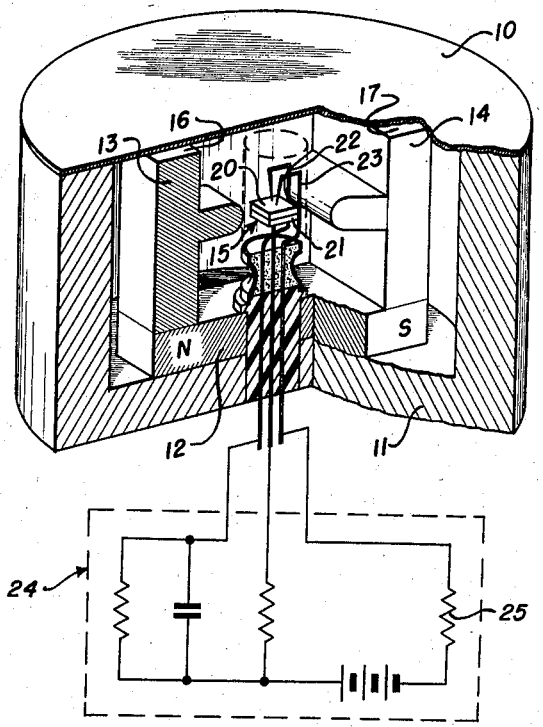
Fig. 1 shows a preferred embodiment of the invention, in which the transistor is mounted in a fixed-reluctance flux path.

As shown in Fig. 1, magnetic diaphragm 10 is supported by nonmagnetic case 11 and is firmly attached thereto by cement, brazing, etc., depending on the case material. Magnet 12 is attached to soft-iron pole pieces 13 and 14 which form part of two flux paths. One flux path has a fixed reluctance and extends from the north pole of magnet 12 into pole piece 13, out its horizontal branch, through transistor 15, into the horizontal branch of pole piece 14 and down to the south pole of the magnet. The second flux path has a variable reluctance due to variable space gaps and extends from the north pole of magnet 12 straight through pole piece 13, across space gap 16, along diaphragm 10, across space gap 17, and straight down pole piece 14 to the south pole of the magnet.

Transistor 15 is shown as the point-contact type of transistor, although the invention will also operate with junction and other type transistors. A layer 20 of semiconducting material such as germanium is supported by base electrode 21 and makes low-resistance contact therewith. Emitter electrode 22 and collector electrode 23 both make rectifying contact with the opposite surface of the semiconducting layer. The transistor is supported between the horizontal branches of pole pieces 13 and 14 and oriented so that magnetic flux lines leading from one horizontal branch to the other transversely intersect the flow of current between the emitter and collector within the transistor. Transistor 15 is electrically connected as part of a conventional negative-resistance oscillator circuit 24 which sustains oscillations by operating in the negative-resistance portion of the transistor characteristics. The oscillations may be observed across resistor 25.

Magnet 12 is a source of a constant amount of flux which divides between the two flux paths according to the reluctance of each. In use, the transducer is mounted so that the pressure to be measured presses upward or downward on diaphragm 10. Changing pressure causes the diaphragm to move, changing the depth of space gaps 16 and 17. This makes a difference in the reluctance of the second flux path, forcing a change in the amount of flux in each flux path. The changing flux in the transistor varies the current flow between the emitter and collector, causing the frequency of oscillations within circuit 24 to vary. Thus a measurement of the frequency will indicate the pressure operating on diaphragm 10.

Figure 2:
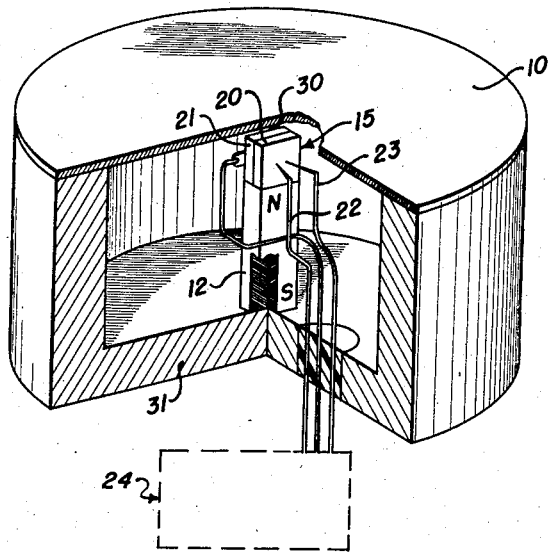
Fig. 2 shows another embodiment of the invention, in which the transistor is mounted in a variable-reluctance path.

Fig. 2 shows another embodiment of the invention, in which the flux path having constant reluctance is the so-called "leakage" flux path in the space about magnet 12. The variable-reluctance path is from the north pole of the magnet, through transistor 15, across space gap 30, through magnetic diaphragm 10, and through magnetic case 31 to the south pole of the magnet. Here again the transistor is oriented so the flux lines are substantially transverse to the current flow from emitter to collector. Movements of the diaphragm have the same effect as in the transducer of Fig. 1, namely, to affect the conduction of the transistor so that the frequency of an oscillatory signal in circuit 24 is varied. However, due to the relatively high reluctance of the flux leakage path of magnet 12 in Fig. 2, the sensitivity of the transducer shown there may be less than that of the transducer of Fig. 1. This would suggest that Fig. 1 be used as a guide for the design of transducers to be used to measure small variations in pressure, and that Fig. 2 be used in conditions of large changes in pressure.

Oscillator circuit 24 has been shown as an example of numerous similar circuits which may be used. If so desired, an amplifier circuit may be used instead, with the result that pressure variations will affect the gain of the amplifier, and a simple voltage measuring device may be used to indicate the pressure.

Other embodiments of the invention may include more than two parallel flux paths, or may include provisions for controlling the direction of the flux through the transistor in response to a movable member, not necessarily a diaphragm.

Figure 3:
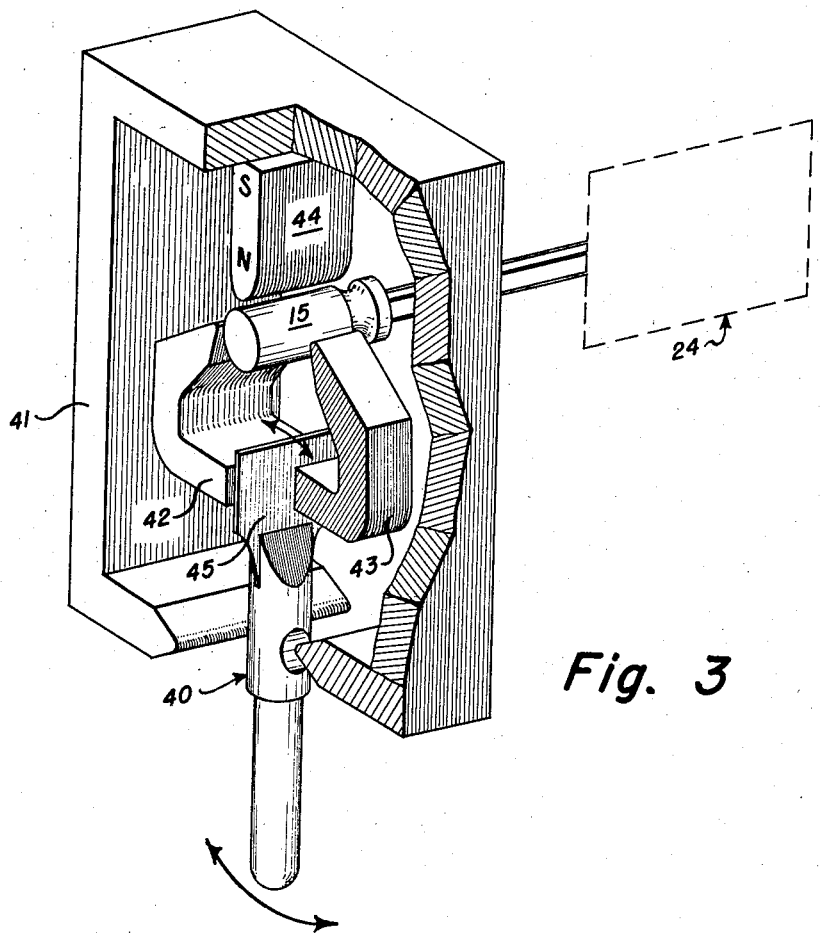
Fig. 3 shows still another embodiment, in which the direction of the flux through the transistor is varied according to pressure.

Fig. 3 shows an embodiment of the latter type. Movable member 40 is pivoted and allowed to move in the directions of the arrows. Case 41, pole pieces 42 and 43, vane 45, and movable member 40 are all made of a highly permeable material such as soft iron. Magnet 44 is attached to case 41, and transistor 15 is located near the free end of magnet 44 and pole pieces 42 and 43. The magnet and the pole pieces are approximately equally spaced about the transistor. Transistor 15 and pole pieces 42 and 43 are supported by conventional means not shown.

When no force is applied to the external end of movable member 40, the flux from magnet 44 divides equally between two paths, since vane 45 is centered between the pole pieces. Case 41 and movable member 40 are common to both paths and division occurs at vane 45, where half of the flux follows pole piece 42 to transistor 15, then to the north pole of magnet 44. The other half of the flux follows pole piece 43 to transistor 15, then to the north pole. The transistor should be oriented so that a component of each half of the flux passes through the transistor in a direction transverse to the direction of the current flowing between the emitter and the collector of the transistor. With the vane in its neutral position, the effect of one flux component on the transistor's characteristics will be cancelled by the other component, since they are equal and opposite in direction.

The transducer will indicate the application of a constant or varying force, or pressure, to the external end of movable member 40 in the direction of either of the arrows. When such a force is applied, vane 45 leaves the neutral position and moves closer to one of the two pole pieces, varying the space gaps between the vane and the pole pieces. This causes an increase in the reluctance of one flux path at the same time the reluctance of the other is decreased. The resultant changes in flux distribution through transistor 15 cause changes in the transistor characteristics, which are indicated by oscillator circuit 24. For instance, if vane 45 is closer to pole piece 42, more flux will appear in the path including that pole piece and the resultant effective component in transistor 15 will increase the efficiency of current flow in the transistor. However, if vane 45 is closer to pole piece 43, the flux path including that pole piece will contain the greater amount of flux, reversing the direction of the resultant effective component of flux in transistor 15 and decreasing the efficiency of current flow therein.

The embodiment shown in Fig. 3 could be adapted to form a phonograph pickup if the external end of movable member 40 held a phonograph needle which is moved by the transverse variations in a phonograph record groove. This type of pickup is unique in that the transduced signal is amplified before leaving the pickup.

A diaphragm-type pressure transducer can be made from the apparatus of Fig. 3 by substituting a diaphragm for movable member 40. The shunting action of the diaphragm when it is acted upon by pressures will produce the same results as beforementioned in connection with Fig. 3.

One skilled in the art will recognize the importance of good magnetic-circuit design practices in this invention, such as the use of high-permeability, low-retentivity pole pieces and the avoidance of sharp turns in the flux paths. Other embodiments of the invention will occur to one skilled in the art and may be made without departing from the scope of the invention as claimed below.

What is claimed is:

1. A pressure transducer comprising a transistor, a source of constant magnetic flux, a first flux path having a constant reluctance, said first flux path including a pair of magnetic pole pieces extending in part from opposite poles of said flux source to substantially opposing sides of said transistor, means for mounting the transistor within the first flux path with such orientation with respect to the flux that the transistor characteristics are dependent upon the amount of flux within the transistor, a second flux path including a resiliently deformable magnetic diaphragm and said pair of magnetic pole pieces further extending from opposite poles of said flux source to within prescribed distances of one side of said diaphragm, said diaphragm being mounted so that any deformation thereof in response to pressure will change said distances, said second flux path thereby having a reluctance proportional to pressure, the first and the second flux paths each including said flux source, whereby a pressure induced change in the reluctance of the second flux path results in a change in the transistor characteristics.

2. A pressure transducer comprising a source of constant magnetic flux, a resiliently deformable magnetic diaphragm, a pair of similar magnetic pole pieces extending from opposite poles of said flux source toward one side of said diaphragm, forming therewith a variable reluctance flux path, said reluctance varying in response to deformation of said diaphragm, a pair of magnetic branch elements of said pole pieces extending toward each other, to form with said pole pieces a fixed reluctance flux path, a transistor having a fixed orientation between said branch elements such that selected characteristics of said transistor depend upon the amount of flux in said fixed reluctance path, said amount of flux being variable in response to variation in reluctance of said variable reluctance path.

3. A pressure transducer as in claim 2, wherein the constant flux source is mounted within one end of a non-magnetic case, the diaphragm is externally attached to the other end of the case, and the transistor is fixedly supported within said case independently of said diaphragm.

4. A pressure transducer as in claim 2, including means for connecting the transistor to an external circuit whereby an electrical signal proportional to the deformation of the diaphragm is produced.

References Cited in the file of this patent

UNITED STATES PATENTS

| | | |
|---|---|---|
| 543,843 | Biggar | Aug. 6, 1895 |
| 1,794,376 | Hartsough | Mar. 3, 1931 |
| 2,553,490 | Wallace | May 15, 1951 |
| 2,553,491 | Shockley | May 15, 1951 |
| 2,695,930 | Wallace | Nov. 30, 1954 |
| 2,702,316 | Friend | Feb. 15, 1955 |
| 2,707,769 | Shaper | May 3, 1955 |
| 2,790,032 | Palle-Finn Berr | Apr. 23, 1957 |
| 2,866,857 | Andrews | Dec. 30, 1958 |